Figure 1:
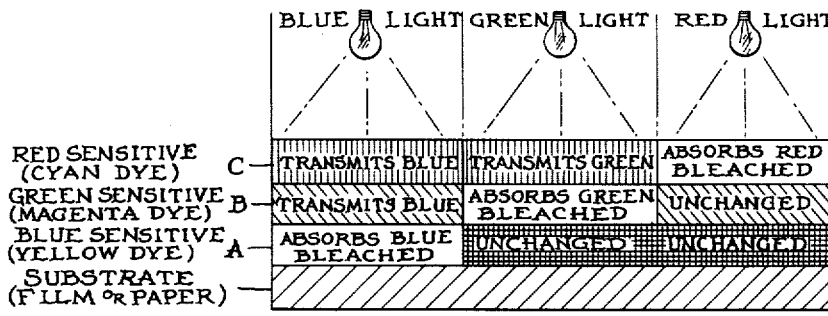

EFFECT OF LIGHT OF THE PRIMARY COLORS

EFFECT OF PROJECTING WHITE LIGHT THROUGH FILM AFTER EXPOSURE OF FIGURE 1.

INVENTORS
ROBERT H. SPRAGUE
HARRY L. FICHTER, Jr.
J. GEORGE FIDELMAN

BY *Lawrence J. Field*

ATTORNEY

United States Patent Office 3,102,027
Patented Aug. 27, 1963

3,102,027
DIRECT POSITIVE DYE BLEACH PROCESS AND MEROCYANINE COMPOSITION THEREFOR
Robert H. Sprague, Cleveland, Harry L. Fichter, Jr., Lakewood, and J. George Fidelman, Cleveland, Ohio, assignors to Horizons Incorporated, Cleveland, Ohio, a corporation of New Jersey
Filed Aug. 19, 1960, Ser. No. 50,696
27 Claims. (Cl. 96—47)

This invention relates to a direct positive photographic process. More particularly, the invention relates to a non-silver direct positive dye-bleach photographic process capable of producing full color photographic prints wherein the dyes comprising the final image are intense, sharp cutting and brilliant colors, yielding a very high quality color rendition.

The photo system of this invention is one of extreme simplicity in which the essential elements are: (1) a light sensitive material which bleaches out when exposed to light of a suitable wavelength and (2) a sensitizing agent which markedly accelerates the aforesaid bleaching-out. Preferably the system also includes a suitable base in which the light sensitive material and the sensitizer are dispersed or on which they may be supported. In the photo system of the present invention direct positive prints of high quality are produced solely by the action of the exposing light without any chemical developing such as that which characterizes conventional photo systems based on silver compounds.

As indicated above in its simplest form the photosensitive system of this invention comprises a light sensitive material and a sensitizing agent. To perform specific functions or to produce specific benefits, other materials may be added to the two essential constituents. For instance a film-forming plastic or resin may serve as the support wherein the sensitizer and light sensitive material are dispersed, or a filler may be added to provide a background of any desired tint or opacity.

The light sensitive materials suitable for the process are the merocyanine dyes and the present use is not to be confused with their already well known use in the photographic art for the optical sensitization of silver halide emulsions, e.g. as described in Sprague 2,622,082; Brooker 2,852,384; Anish 2,553,494; Knott 2,839,403 and -404; and man other similar patents. In general all classes of merocyanines may be used such as simple merocyanines, merocarbocyanines, merodicarbocyanines, merotricarbocyanines, or other meropolycarbocyanines, and the several types of so-called "complex" merocyanines including "rhodocyanines." Merocyanine dyes are derived from quaternary salts of heterocyclic bases by condensation reactions with ketomethylene derivatives. Suitable bases having 5 or 6 membered heterocyclic nuclei which may be used in the preparation of merocyanine dyes for the present invention include the following:

Thiazole
Oxazole
Selenazole
Imidazole
Benzothiazole
Benzoselenazole
Benzimidazole
Naphthothiazole
Naphthaoxazole
Thiazoline and the like.

In the copending application of Sprague, Fichter and Hamilton, Serial No. 47,849, filed August 5, 1960, a dye-bleach process is described for production of direct-positive photographic images utilizing dyes of the cyanine class. The merocyanine dyes which are the subject of the present invention constitute an improvement over the dyes described in the aforementioned specification in that higher printing speeds are obtainable with them.

One object of this invention is to provide a non-silver direct positive dye-bleach photographic system capable of producing full color photographic prints. Another object of this invention is to provide a photo system for producing single color prints of intense and brilliant color.

Still another object of the invention is to provide a relatively simple photo system wherein full color direct positive prints are produced solely by the action of the exposing light without any chemical development.

Still another object of the invention is to provide a process wherein the colored image produced may be stabilized and fixed by a simple heat treatment.

A still further object of this invention is to provide a process for producing positive transparencies in full color, either for projection or for color prints when coated on a white opaque substrate.

A still further object of the invention is to provide a simple photo system for the production of office copy.

Figure 2:
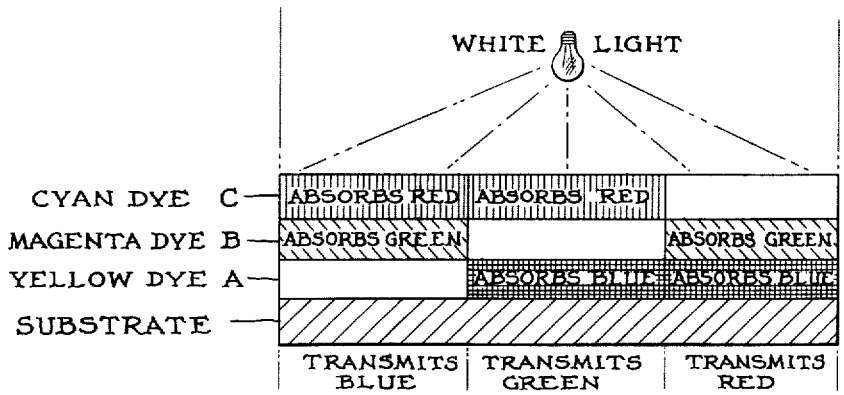

These and other objects are achieved by utilizing the present photographic system in any of the several alternative modes of practicing the invention described below and illustrated in the accompanying drawings in which:

FIGURE 1 diagrammatically illustrates the effect of exposure of a tripack to light of various color, and FIGURE 2 schematically shows the resulting direct positive obtained after the exposure of FIGURE 1.

A direct positive full color print may be obtained by utilization of an integral tripack of three sensitive layers. Each layer comprises a sensitive coating containing a dye of the proper color mixed with a suitable activating agent and dispersed in a convenient film-former. Any of the layers may also include extraneous materials added for specific purposes, e.g. to alter the speed of the system. When the sensitive coating is exposed image-wise to light of the wavelength absorbed by the dye, the dye is bleached in the area struck by the light, with the result that a direct-positive image remains in the layer. By proper selection of the dyes an accurate color rendition is obtained by a subtractive process.

For example, a green sensitive layer may be obtained with the process, using a magenta dye, which is, of course, green absorbing, transmitting blue and red freely. When such a film is exposed in a camera, for example, to light reflected from colored objects, the action of green light on this layer is to bleach the magenta dye. It is not, of course, affected by blue or red light; light of these wavelengths is not absorbed by the sensitive material. What is obtained in this layer, therefore, is a minus-green record which corresponds, for example, with the magenta printer in conventional color printing processes.

Similarly, a blue-sensitive layer, comprising a yellow dye, is bleached on exposure to blue light, giving a minus-blue record which corresponds to the yellow printer in conventional printing processes.

Finally, a red-sensitive layer, containing a cyan dye, is bleached by red light, giving a minus-red image corresponding to the cyan printer in color printing processes.

When these three sensitive layers are superimposed in an integral tripack it will be seen that, since all three of the dyes transmit freely in the areas in which they do not absorb, light of a particular color will affect only a single layer. The result of the subtractive reflection of light from a white, opaque substrate on such exposed layers is the reflection of light of the same color as that originally exposing the material.

This may be further illustrated by reference to FIGURE 1.

The three-layer integral tripack, depicted in FIGURE 1 consists of three light-sensitive layers superimposed, one on top of the other. The coating nearest the substrate is a blue-sensitive yellow dye labelled "A," the coating on top of this is a green-sensitive magenta dye labelled "B," and the topmost coating is a red-sensitive cyan dye labelled "C."

The effect of light of the primary colors, blue, green and red, on such a coating is illustrated by the diagram under the areas marked "Blue Light," "Green Light," and "Red Light." Since the red-sensitive layer, "C," and the green-sensitive layer, "B," transmit blue light freely, no effect is obtained with blue light until layer "A" is reached; whereupon the yellow dye is bleached in this area. Therefore, in the area of the film struck by blue light, there remain the cyan layer and the magenta layer. After fixing, which may be accomplished by short heating, if such a developed film is viewed under white light, the cyan layer will absorb red light; the magenta layer will absorb green light; while both the cyan layer and magenta layer will transmit blue freely, as shown in FIGURE 2.

In this way, the result is reflection or transmission of only blue in the area which was originally struck by blue light; in other words, a direct positive is obtained. Similarly, when green light strikes the three-layer coating, the cyan dye will transmit the green freely while the magenta dye will absorb the green light and be bleached. Since the cyan dye and the yellow dye are still intact and the former will absorb red while the latter will absorb blue, the net reflection or transmission from the bleached layer will be green; again, a direct positive. Finally, in the area struck by red light, the cyan dye will absorb this radiation and be bleached. The green- and blue-sensitive layers will be unaffected. The magenta dye will absorb the green light, the yellow dye will absorb the blue light, and the net reflection from the combined three layers will be red.

Our novel direct-positive photo process is thus useful for providing positive transparencies for projection when coated on a clear film base or for color prints when coated on a white opaque substrate.

The dye-bleach photographic process of the present invention, by virtue of its extreme simplicity and absence of wet-development procedures, is thus a marked improvement over the earlier art.

As indicated above, the dyes used in the present photographic process belong to the class known as merocyanines, which have been used for many years in conventional silver halide emulsions as optical sensitizers, i.e. to sensitize the emulsion to visible light. We have found that when such dyes are mixed with a suitable organic halogen-containing compound such as, for example, carbon tetrabromide and coated on a suitable substrate preferably in a convenient binder such as nitrocellulose solution the resulting coating is sensitive to light corresponding to the wavelength absorbed by the dye; and the effect of absorption of light in the visible region is to bring about bleaching of the dye in the light-sensitive coating.

Although we do not wish to be bound to any specific theory, it appears that a complex may be formed between the carbon tetrabromide, for example, and the merocyanine dye which requires less energy to raise it to an excited state to permit the desired photolytic reaction to take place than when such complexes do not form.

The dyes of the present invention when a suitable organic halogen compound is present are bleached when exposed to light, giving as described above a direct positive image. Furthermore, the bleach-out process of this invention requires no solvent extraction for fixation to render the dye image permanent; a short heating period only is needed to destroy any sensitivity remaining in the system after exposure to visible light.

In addition to its application to color photography, our novel photosensitive system may be used as an office photocopy material. Thus, for example, a mixture comprising a suitable organic halogen compound and a mixture of light sensitive merocyanine dyes, in such proportions that a neutral gray-black color is produced, may be used in a suitable exposing device to give a direct positive copy of printed material. Such a system has the advantage that no wet processing is required to develop the image and, furthermore, being sensitive to light of all colors makes it possible to copy colored signatures or colored printing. Furthermore, a three-layer coating material such as that shown in FIGURE 1 may be used to copy colored engineering drawings, for instance, in color. We have found that not only can our light-sensitive photocopy material be exposed by normal exposing techniques, such as those used in photographic printing, but it may also be used as a reflex copy material in which the exposure is made through the back of the photosensitive sheet. This has the advantage that it permits the copying of material which has been printed on both sides of the sheet.

In general terms, therefore, our novel photosensitive system is utilized in a variety of ways. If it is desired to produce a single color, direct positive image, as a result of the bleach-out reaction in the visible, a merocyanine dye is chosen having absorption characteristics compatible with the source of light available in the visible. This is combined with a suitable organic halogen-containing compound and the combination is dispersed and coated on a suitable substrate. After exposure to light of the appropriate color, either in a camera or through an appropriate image-forming copy, an image of intense brilliance is obtained, the unexposed portions remaining the original color. By utilizing three superimposed color-sensitive layers, as previously described, a full-color reproduction of the original may be obtained. Finally, if the mixture of dyes is coated to give a neutral density on the photosensitive sheet, direct positive photocopy materials may be prepared, using our new photosensitive system capable of copying colored subjects either in monochrome or full color, and which may be exposed by reflex techniques if desired.

The merocyanine dyes useful for the purposes of our invention are of diverse types well-known to those skilled in the art of optical sensitization of silver halide emulsions. In general, all classes of merocyanines are useful such as simple merocyanines, merocarbocyanines, merodicarbocyanines, merotricarbocyanines, and the several types of so-called "complex" merocyanines, including "rhodocyanines." Merocyanine dyes are derived from quaternary salts of heterocyclic bases, and more-or-less complex intermediate compounds derived from them, by condensation reactions with ketomethylene derivatives by methods well-known to those skilled in the art. The following list is representative of heterocyclic bases useful in such reactions.

2-methylbenzothiazole
2-methylbenzoxazole
2-methylbenzimidazole
2-methylthiazoline
Quinaldine
Lepidine
1-methylisoquinoline
2-methyl-α-naphthothiazole
2-methyl-β-naphthothiazole
Alpha-picoline
Gamma-picoline
3-methylisoquinoline
2,4-dimethylthiazole
2-methyl-4-phenylthiazole
2-methylthiazole
2,3,3-trimethylindolenine
2,4-dimethylselenazole 2-methylbenzoselenazole
2,4-dimethyloxazole
2-methyl-α-naphthoxazole
2-methyl-β-naphthoxazole
2-methyl-4,5,6,7-tetrahydrobenzothiazole
2-methyl-4,5,6,7-tetrahydrobenzoxazole
2-methyl-5,6,7,8-tetrahydro-4-cycloheptathiazole
2-methyl-5,6-dihydro-4-cyclopentathiazole
2-methyl-6,7-dihydro-4-H-pyrano(4,3D)thiazole
2-methyl-6,7-dihydro-4-H-thiopyrano(4,3D)thiazole
2-methyl-5,6-dihydro-4-H-pyrano(3,2D)thiazole The following is a list of representative ketomethylene compounds useful in such condensation reactions:

3-ethyl rhodanine
Acetyl acetone
Diethyl malonate
3(2H)-thianaphthenone
5-methoxy-3(2H)-benzofuranone
1,3-indanedione
3-phenyl-2,4-thiazolidinedione
3-ethyl-2-thio-2,4-oxazolidinedione
2-diphenylamino-4(5H)-thiazolone
3-ethyl-1-phenyl-2-thiohydantoin
Ethyl cyanoacetate
3-p-carboxyphenylrhodanine
3-methyl-1-p-sulfophenylpyrazolone
3-methyl-1-phenyl-5-pyrazolone
1-ethyloxindole
Hippuric acid
3-phenyl-5(4H)-isoxazolone
1,3-diethylbarbituric acid
1,3-diethyl-2-thiobarbituric acid
Malonanilide
Cyanoacetamide
Cyanoacetanilide
Benzoylacetonitrile Merocyanines useful in this invention are characterized by the following general formulas:

I. BINUCLEAR MEROCYANINES

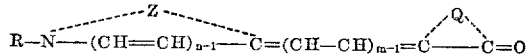

wherein R represents a member selected from the group consisting of alkyl and aralkyl groups (including carboxyalkyl and sulfoalkyl groups), n represents a positive integer of from 1 to 2, m represents a positive integer of from 1 to 4, and Q represents the non-metallic atoms necessary to complete a heterocyclic nucleus containing from 5 to 6 atoms in the ring. Exemplary of heterocyclic nuclei containing from 5 to 6 atoms in the ring are:

Rhodanine nuclei (e.g. unsubstituted rhodanine,
3-ethylrhodanine,
3-β-hydroxyethylrhodanine,
3-carboxymethylrhodanine,
3-β-sulfoethylrhodanine,
3-(1,3-dicarboxy-n-propyl)rhodanine,
3-α-carboxyethylrhodanine,
3-p-carboxyphenylrhodanine,
3-(3-carboxy-4-hydroxyphenyl)rhodanine,
3-p-sulfophenylrhodanine,
3-(2,5-disulfophenyl)rhodanine,
3-phenylrhodanine,
3-p-dimethylaminophenylrhodanine, etc.),
2-thio-2,4(3,5)oxazoledione nuclei (e.g. 3-ethyl-2-thio-2,4(3,5)oxazoledione,
3-p-sulfophenyl-2-thio-2,4(3,5)oxazoledione,
3-p-sulfophenyl-2-thio-2,4(3,5)oxazoledione,
3-carboxymethyl-2-thio-2,4(3,5)oxazoledione,
3-sulfomethyl-2-thio-2,4(3,5)oxazoledione, etc.),
2-thiohydantoin nuclei (e.g. unsubstituted 2-thiohydantoin,
1,3-diphenyl-2-thiohydantoin,
3-ethyl-1-phenyl-2-thiohydantoin,
1-methyl-2-thiohydantoin,
1-carboxymethyl-3-phenyl-2-thiohydantoin, etc.),
5-pyrazolone nuclei (e.g. 1-phenyl-3-methyl-5-pyrazolone,
3-methyl-1-(2-benzothiazolyl)-pyrazolone,
3-carboxymethyl-1-phenyl-5-pyrazolone,
1-carboxyphenyl-3-methyl-5-pyrazolone,
3-methyl-1-p-sulfophenyl-5-pyrazolone,
1-(4-sulfo-1-naphthyl)-3-methyl-5-pyrazolone, etc.),
4-thiazolidone nuclei,
2-amino-4(5)-thiazolone nuclei (e.g. 2-diphenylamino-4(5)thiazolone,
2-diethylamino-4(5)thiazolone, etc.),
2-alkylmercapto-4(5) thiazolone (e.g. 2-methylmercapto-4(5)-thiazolone,
2-ethylmercapto-4(5)thiazole, etc.),
Barbituric acid nuclei (e.g. unsubstituted barbituric acid, 2-thiobarbituric acid, etc.), and the like.

Z represents the non-metallic atoms necessary to complete a heterocyclic nucleus containing from 5 to 6 atoms in the heterocyclic ring, e.g. a nucleus of the benzoxazole series (e.g. benzoxazole,
5-chlorobenzoxazole,
5-bromobenzoxazole,
5-methylbenzoxazole,
5-ethylbenzoxazole,
5-methoxybenzoxazole,
5-ethoxybenzoxazole,
5-acetaminobenzoxazole,
5-phenylbenzoxazole,
6-chlorobenzoxazole,
7-chlorobenzoxazole, etc.), a nucleus of the benzothiazole series (e.g. benzothiazole,
4-chlorobenzothiazole,
7-chlorobenzothiazole,
5-chlorobenzothiazole,
4-phenylbenzothiazole,
4-methoxybenzothiazole,
4-methylbenzothiazole,
5-bromobenzothiazole,
5-acetaminobenzothiazole,
5-iodobenzothiazole,
5-dimethylaminobenzothiazole,
5-methylbenzothiazole,
5-methoxybenzothiazole,
5-ethoxybenzothiazole,
5-phenylbenzothiazole,
6-methylbenzothiazole,
6-chlorobenzothiazole,
6-methoxybenzothiazole,
6-ethoxybenzothiazole, etc.), a nucleus of the benzoselenazole series (e.g., benzoselenazole, 5-chlorobenzoselenazole, etc.), a nucleus of the α-naphthothiazole series, a nucleus of the β-naphthothiazole series, a nucleus of the α-naphthoxazole series, a nucleus of the β-naphthoxazole series, a nucleus of the α-naphthoselenazole series, a nucleus of the β-naphthoselenazole series, a nucleus of the thiazoline series, a nucleus of the simple thiazole series (e.g. 4-methylthiazole, 4-phenylthiazole, 4-(2-thienyl)thiazole, etc.), a nucleus of the simple selenazole series (e.g. 4-methylselenazole, 4- phenylselenazole, etc.), a nucleus of the simple oxazole series (e.g. 4-methyloxazole, 4-phenylthiazole, etc.), a nucleus of the quinoline series (e.g. quinoline, 6-methylquinoline, 6-methoxyquinoline, etc.), a nucleus of the pyridine series, a nucleus of the 3,3-dialkylindolenine series (e.g. 3,3-dimethylindolenine, etc.), etc.

One member of this group, having the Formula A and the chemical name 3-ethyl-5-[(1-methyl-4-(1H)-quinolylidene)ethylidine]rhodanine, is considered typical of the binuclear merocyanine class:

(A)
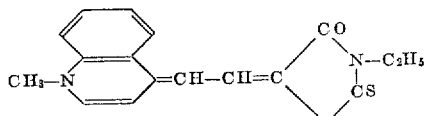

In the generalized formulas which follow the symbol [M] will be used to represent:

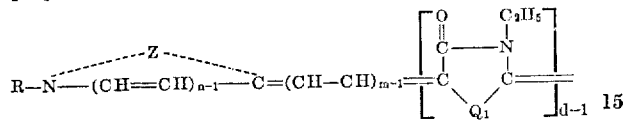

wherein R, Z, n and m have the meanings indicated above; d represents a positive integer from 1 to 4; and $Q_1$ represents a member selected from the group consisting of —O—, —Se—, —S—, and $$-\underset{\underset{R_2}{|}}{N}-$$

wherein $R_2$ represents a member selected from the group consisting of alkyl and aryl.

II. COMPLEX MEROCYANINES

wherein [M] and Q each has the meaning indicated.

One member of this group, having the Formula B and the chemical name 5-[(3β-carboxyethyl-2(3)-benzoxazolylidene)ethylidene]-3-ethyl-5-(3-ethyl - 4 - oxo - 2 - thiono-5-thiazolidylidene)-4-thiazolidone, is considered typical of the group of complex merocyanines.

(B)
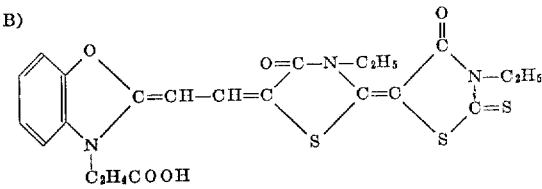

III. QUATERNIZED MEROCYANINES

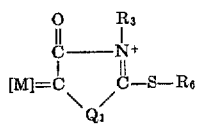

wherein [M] and $Q_1$ each has the same meaning as in the general Formula II above, and wherein $R_3$ represents a member selected from the group consisting of alkyl, aralkyl, and aryl groups, $R_6$ represents a member selected from the group consisting of alkyl and aralkyl groups, and $X^-$ represents an acid radical.

One member of this group, having the Formula C and the chemical name 5-[(1-ethyl-2(1)-quinolylidene) ethylidene]-2-methylmercapto-4-thiazolone etho-p-toluene sulfonate, is considered representative of the class of quaternized merocyanines:

(C)
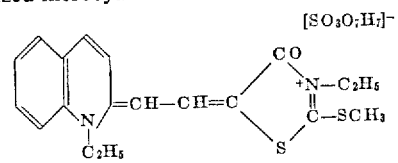

IV. QUATERNARY SALTS DERIVED FROM MEROCYANINES

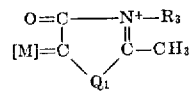

wherein $Q_1$, $R_3$, [M] and $X^-$ each has the same meaning as in general Formula II above.

One member of this group, having the formula D and the chemical name 5-[1-(ethyl-4(1)-quinolylidene) ethylene]-2-methyl-4-thiazolone etho-ethyl sulfate, is considered typical (D)
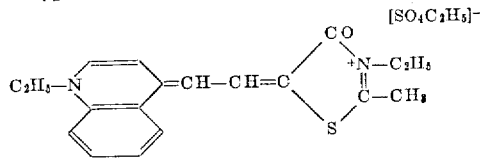

of the class of quaternary salts derived from merocyanines.

V. BIS-MEROCYANINES DERIVED FROM QUATERNARY SALTS OF MEROCYANINE

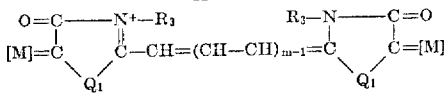

wherein $Q_1$, $R_3$, $X^-$ and [M] each has the same meaning as in general Formula III above.

One member of this group, having the Formula E and the chemical name bis-{3-ethyl-5[(3-ethyl-2(3)-benzoxazolylidene)ethylidene] - 4 - thiazolone} methine cyanine ethylsulfate.

(E)
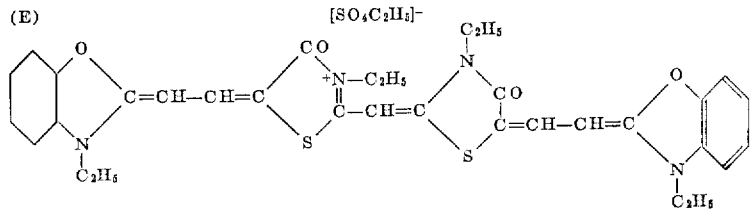

is considered typical of the class of bis-merocyanines derived from quaternary salts of merocyanines.

VI. UNSYMMETRICAL DYES FROM QUATERNARY SALTS OF MEROCYANINES

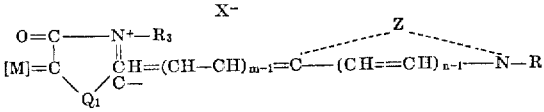

wherein R, m, n, [M], $Q_1$, $R_3$, $X^-$ and Z each has the same meaning as in general Formula III above.

One member of this group, having the Formula F and the chemical name 2-[3-(ethyl-2(3)-benzoxazolylidene)allyl]-5-[(1 - ethyl-2(1)-quinolylidene)ethylene]-4-thiazolone etho-p-toluene sulfonate (F)

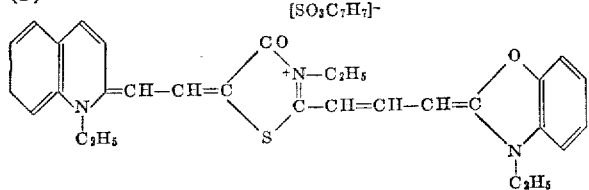

is considered typical of the class of unsymmetrical dyes from quaternary salts of merocyanines.

VII. STYRYL AND BUTADIENYL DYES FROM QUATERNARY SALTS OF MEROCYANINES

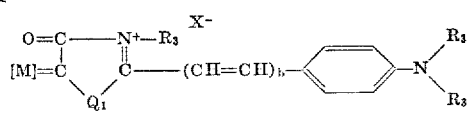

wherein $Q_1$, $R_3$, $X^-$ and [M] each has the same meaning as in general Formula III above, and $b$ represents a positive integer of from 1 to 2.

One member of this group, having the Formula G and the chemical name 5-[(1-ethyl-4(1)-quinolylidene) ethylidene]-2-p-dimethyl-aminostyryl-4-thiazolone etho-ethyl sulfate (G)

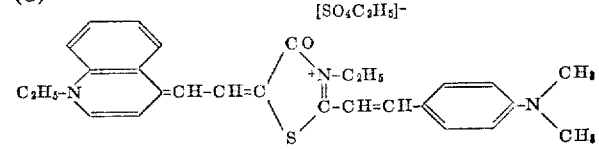

is considered typical of the class of styryl dyes from quaternary salts of merocyanines.

VIII. PYRROLOCYANINES FROM QUATERNARY SALTS OF MEROCYANINES

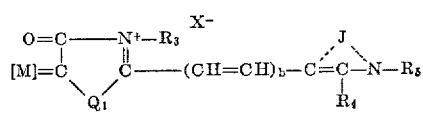

wherein $Q_1$, $R_3$, $X^-$ and [M] each has the same meaning as in general Formula III above; $b$ represents a positive integer of from 1 to 2; $R_4$ represents hydrogen, alkyl or a chemical bond in a pyridine ring; $R_5$ represents hydrogen, alkyl, aryl or a chemical bond in the same pyridine ring as $R_4$; and J represents the non-metallic atoms necessary to complete a pyrrole nucleus.

One member of this group, having the Formula H and the chemical name 5-[1-ethyl-4(1)-quinolylidene) ethylidene]-2-[2-(2,5-dimethyl-1-phenyl-3-pyrryl)-vinyl]-4-thiazolone etho-p-toluene sulfonate (H)

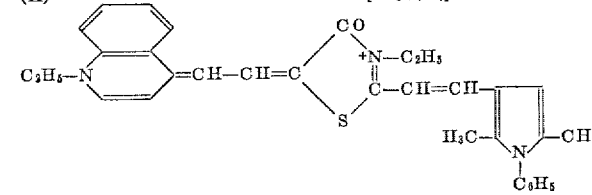

is considered typical of the class of pyrrolocyanines derived from quaternary salts of merocyanines.

IX. HEMICYANINES DERIVED FROM QUATERNIZED MEROCYANINES

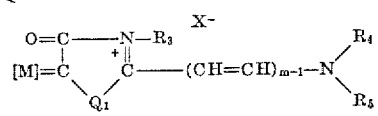

wherein $Q_1$, $R_3$, $X^-$ and [M] have the same meaning as in general Formula III above; $R_4$ represents an alkyl, aralkyl or aryl group or a chemical bond in a saturated heterocyclic ring; and $R_5$ represents an alkyl, aralkyl or aryl group or a chemical bond in the same saturated heterocyclic ring as $R_4$.

One member of this group, having the structural Formula I and the chemical name 5-[(3-ethyl-2(3)-benzoxazolylidene)ethylidene]-2-piperidyl-4-thiazolone etho-p-toluene sulfonate (I)

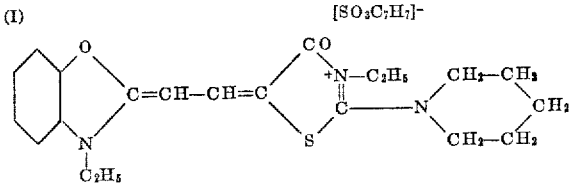

is considered typical of the class of hemicyanines derived from quaternized merocyanines.

Bleachout of the merocyanines described above is accelerated by the presence of a suitable organic halogen-containing compound. Preferred compounds are those with at least three halogen atoms attached to a single carbon atom, carbon tetrabromide being a particularly preferred species.

Organic halogen-containing compounds which have been found to be useful for the purposes of our invention include the following:

Pentabromoethane
Carbon tetrabromide
Hexabromoethane
Hexachloroethane
p-Nitrobenzotribromide
Bromotrichloromethane
Carbon tetraiodide
Benzotribromide
Iodoform
2,2,2-tribromoethanol
Chloroform
Hexachloropropane
$\alpha,\alpha,\alpha,\alpha',\alpha',\alpha'$-Hexachloro-p-xylene
$\alpha,\alpha,\alpha,\alpha',\alpha',\alpha'$-Hexachloro-m-xylene
Bromoform
1,1,1-trichloro-2-methyl-2-propanol
$\alpha,\alpha,\alpha$-Trichlorotoluene Each of the above compounds is an organic halogen containing compound which is normally solid at room temperature and which may be represented by the following general formula $$A-C-X_3$$

wherein A represents a monovalent radical selected from the group consisting of H, Br, Cl, I, alkyl and aryl and each X represents a halogen selected from the group consisting of chlorine, bromine and iodine.

In the examples which follow, the proportions of sensitizer to bleach-out dye illustrated, range from approximately equal parts by weight up to 80 parts of sensitizer for each part of bleach-out dye, but it is to be understood that up to 10,000 parts by weight of the bleach-out accelerator may be present for each part of bleach-out dye, by weight.

Suitable organic binder solutions which have been found to be useful for the purposes of our invention include the following:

Nitrocellulose in alcohol
Polyvinyl chloride in tetrahydrofuran
Polystyrene in benzene
Polyvinylchloride-polyvinylidenechloride copolymer (Saran) in methyl ethyl ketone
Ethyl cellulose in alcohol It will be evident that many other compatible and inert binders may be substituted for those listed above, including a wide variety based on polymers of vinylidene and/or vinyl monomers, copolymers of vinyl and/or vinylidene monomers, mixtures of said polymers and/or copolymers as well as those based on other cellulose derivatives than those listed by way of illustration. As indicated in the examples which follow, the specific vehicle or carrier for the merocyanine dye and the organic halogen compound does not appear to constitute a critical aspect of the invention since it appears that this constituent merely serves as a support whereby the two active ingredients are maintained in intimate physical association.

The following examples are indicative of specific methods of practice of preferred embodiments of our invention and are to be considered as illustrative rather than as limitative:

Example 1

A solution of the deep-blue colored dye, 3-ethyl-5-[(1-methyl-4(1H)-quinolylidene)-ethylidene]rhodanine, containing 0.2 gram of dye crystals dissolved in 30 cc. acetone, 30 cc. methyl alcohol, and 30 cc. dimethyl formamide, together with 8 grams of carbon tetrabromide, was coated on paper to produce an intensely blue colored sheet.

Exposing this sensitized sheet to light under a suitable subject produced a high-contrast direct positive copy of the subject, with clear white grounds in the bleached-out sections of the print. A short exposure of the finished print to an infrared lamp produced a permanently fixed copy no longer sensitive to light.

In order to make a copy from an opaque subject, or one with printing on both sides, it is possible to make "reflex" exposures, that is expose to light through the back of the sensitized sheet, the face of which is in contact with the subject to be copied. When making reflex copies of translucent subjects it is advisable to place behind the subject a sheet of white reflecting material such as white bond paper.

Example 2

Similarly, if in place of the dye mentioned above, the dye 5-[(1-methyl-4-(1)-quinolylidene ethylene]-2-methylmercapto-4(5)-thiazolone-p-toluene sulfonate having the following structure

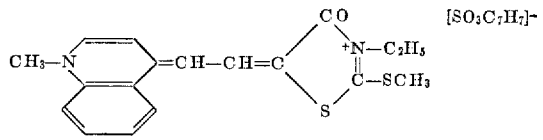

is used in a similar sensitizing solution, the coated paper is purple in color. Exposing this sensitized sheet to light from a photoflood lamp under a suitable subject produced a direct positive copy of the subject.

Example 3

If in place of the dye used in Example 1 above, the dye 5-[(1-methyl-4(1)-quinolylidene)ethylidene]-2-[(1-methyl-4(1)-quinolylidene)methyl]-4(5)-thiazolone etho-p-toluene sulfonate having the following structure

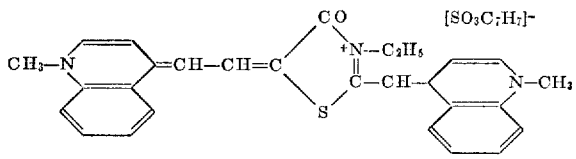

is used in a similar sensitizing solution, the coated paper is blue in color. Exposure of the sensitized sheet to light from a photoflood lamp under a suitable subject produced a direct positive copy of the subject.

Example 4

A mixture of 0.4 gram of the yellow dye 4-[(3-ethyl-2(3H)-benzoxazolylidene) - ethylidene]-3-methyl-1-phenyl-5-pyrazolone and 0.2 gram of the magenta dye 3-ethyl-5-[(1-methyl-2(1H)-pyridylidene) - ethylidene]-rhodanine and 0.2 gram of the cyan dye 4-[4-(1-methyl-4(1H)-pyridylidene - 1,3 - butenylidene] - 3 - methyl-1-phenyl-2-pyrazoline-5-one, dissolved in 20 cc. dimethyl formamide, 40 cc. methanol, and 40 cc. acetone, to which were added 8 grams of pentabromoethane and 2 grams of hexabromoethane, was coated on paper to give a neutral dark-gray-to-black colored sheet.

Exposing this sensitized sheet under a suitable subject in an Ozalid type of printing machine produced a high-contrast, black-on-white, direct positive copy of the original without requiring the usual ammonia or wet development.

By exposing through the back of the sensitized material, reflex copies were obtained of one side of subjects printed on both sides.

Example 5

A solution containing 8 grams nitrocellulose, 40 cc. acetone, 40 cc. methanol, 20 cc. dimethyl formamide, 0.2 gram of the yellow dye 4-[(3-ethyl-2(3H)-benzoxazolylidene)-ethylidene]-3-methyl-1-phenyl-5-pyrazolone, and 16 grams carbon tetrabromide were applied to a .005 inch cellulose acetate clear film. After drying, another coating was superimposed on top of the first by applying a solution of 0.2 gram of the magenta dye 3-ethyl - 5 - [(1 - methyl-2(1H)-pyridylidene)-ethylidene]-rhodanine, and 4 grams carbon tetrabromide in 100 cc. of a 10% nitrocellulose solution in 4 parts acetone, 4 parts methanol, and 2 parts dimethyl formamide. Finally, a third sensitized layer was superimposed upon the first two by applying a solution of 0.2 gram cyan dye 4-[4-(1 - methyl - 4(1H) - pyridylidene - 1,3 - butenylidene]-3-methyl-1-phenyl-2-pyrazoline-5-one, and one gram carbon tetrabromide in a similar 10% nitrocellulose solution.

The resultant film, after drying, was exposed in four sections to a 375-watt reflector photoflood lamp at a distance of 10 inches as follows: the first area, through a Kodak Wratten No. 49 (blue) filter; the second area, through a No. 61 (green) filter; the third area, through a No. 29 (red) filter; and, finally, the remaining area was exposed directly to the normal white radiation of the lamp.

After 4 minutes' exposure, a picture was obtained which duplicated the color of the subject in each section.

In a like manner, by substituting color transparencies for the color filters used above, it is possible to make direct positive copies, in color, of the original pictures.

Example 6

In place of the cellulose acetate film used in Example 5 (above), a sheet of paper was coated in a like manner to support three sensitized layers on the substrate. The resulting sensitized sheet, when exposed through a colored film subject to a photoflood lamp, was found to produce an exact copy, duplicating the colors of the subject.

By this method it is likewise practicable to make copies, in color, of a wide range of subjects as, for example, multicolored engineering drawings on tracing paper.

Example 7

A solution of the orange colored dye having the structure

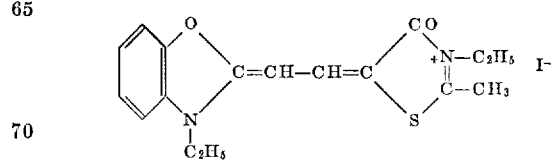

and the chemical name 5-[(3-ethyl-2(3)-benzoxazolylidene)-ethylidene]2-methyl-4-thiazolone ethiodide, containing 0.3 gram of dye crystals dissolved in 30 cc. methanol together with 8 grams of carbon tetrabromide dissolved in 20 cc. of acetone, was coated on paper to produce an intense orange-colored sheet.

Exposing this sheet to light under a suitable subject produced a high-contrast direct positive copy of the subject.

*Example 8*

Similarly, if in place of the dye mentioned in Example 7 above is substituted the dye, 2,2'-bis-{5-[(3-ethyl-2(3)-benzoxazolylidene)ethylidene]-3-ethyl-4 - thiazolone}-trimethine cyanine iodide, having the following structure

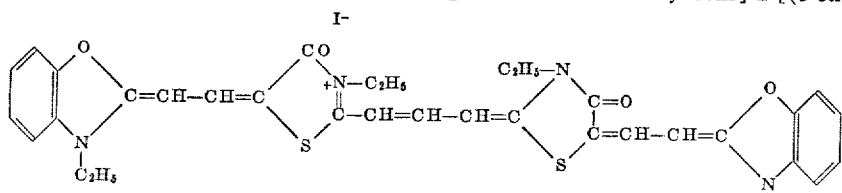

the coated paper is blue-green in color. Exposing this sensitized sheet to light from a photoflood lamp under a suitable subject produced a direct positive copy of the subject.

*Example 9*

Similarly, if in place of the dye mentioned in Example 7 above is substituted the dye, 5-[(3-ethyl-2(3)-benzoxazolylidene)ethylidene] - 2 - p-dimethylaminostyryl-4-thiazolone ethiodide, having the following structure

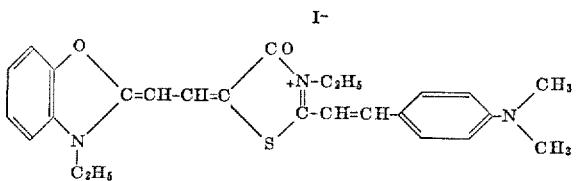

the coated paper is pink in color. Exposing the sensitized sheet to light from a photoflood lamp under a suitable subject produced a direct positive copy of the subject.

*Example 10*

Similarly, if in place of the dye used in Example 5 above is substituted the dye, 7-[(3-ethyl-2(3)-benzoxazolylidene)ethylidene] - 2 - [β-(2,5-dimethyl-1-phenyl-3-pyrryl)vinyl]-4-thiazolone ethiodide, having the structure

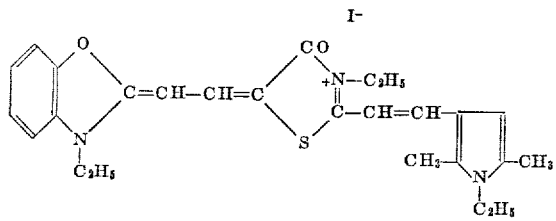

the coated paper is orange in color. Exposing this sensitized sheet to light from a photoflood lamp under a suitable subject produced a direct positive copy of the subject.

*Example 11*

Similarly, if in place of the dye used in Example 7 above is substituted the dye, 5-[(3-ethyl-2(3)-benzoxazolylidene)ethylidene]-2-(1-piperidino)-4-thiazolone ethiodide, having the following structure

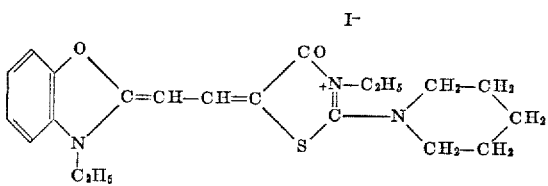

the coated paper is orange in color. Exposing this sensitized sheet to light from a photoflood lamp under a suitable subject produced a direct positive copy of the subject.

*Example 12*

A solution of 10 milligrams of the dye, 3-ethyl-5-[β-(3 - ethyl-5,6-dimethyl-2(3)-benzothiazolylidene)-α-ethylethylidene]-2-[(3-ethyl-4-methyl - 5 - phenylthiazole-ethiodide)-methylidene]-4-thiazolidone, having the structure

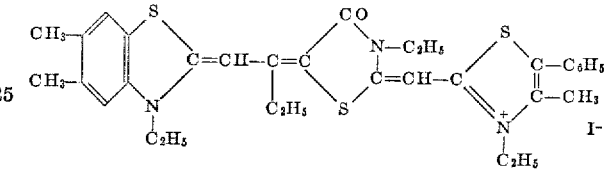

and 0.5 gram of carbon tetrabromide dissolved in 6 cc. of a mixture of equal parts of acetone, methanol, and dimethylformamide, was coated on a translucent paper base to give an intensely colored blue sheet.

Upon exposing this sheet in contact with a suitable subject, in the usual manner for making reflux prints, a good reflux copy of the subject was obtained.

In the foregoing examples, the proportions of halogen sensitizing agent to merocyanine are between 1 to 10,000 parts by weight of sensitizing agent for each part by weight of merocyanine. A particularly preferred range of proportions is between 1 and 150 parts by weight of sensitizing agent to each part by weight of merocyanine.

Having now described our invention as required by the patent statutes, we claim:

1. A photosensitive composition consisting essentially of a merocyanine dye and a photolytically active sensitizing agent which accelerates bleachout of said merocyanine dye on exposure to light of a suitable wavelength; said sensitizing agent being selected from the group consisting of alkyl, aryl and aralkyl compounds containing at least three halogen atoms selected from the group consisting of Cl, Br and I, at least three of said halogen atoms being directly attached to a single carbon atom, and said merocyanine being selected from the group consisting of merocyanine dyes represented by the general formulas:

[M]=[G]

wherein [M] represents

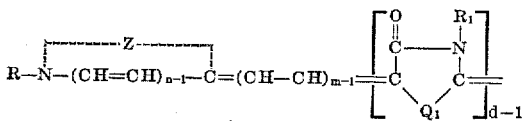

in which R represents a member selected from the group consisting of alkyl, aralkyl, carboxyalkyl and sulfoalkyl, Z represents the non-metallic atoms necessary to complete a heterocyclic nucleus containing from 5 to 6 atoms in the ring, $n$ is a positive integer from 1 to 2, $m$ is a positive integer from 1 to 4, $R_1$ represents a member selected from the group consisting of lower alkyl and hydrogen, $d$ is a positive integer from 1 to 4, and $Q_1$ represents a member selected from the group consisting of —O—, —Se—, —S—, and

wherein $R_2$ is selected from the group consisting of monovalent alkyl and aryl radicals, and [G] represents a structure selected from the group consisting of $$=C\overset{Q}{\diagdown}C=O$$

$$\begin{matrix}O=C\text{------}N-R_3 & X^- \\ =C & C-S-R_6 \\ & Q_1 \end{matrix} \quad \begin{matrix}O=C\text{------}N-R_3 & X^- \\ =C & C-CH_3 \\ & Q_1 \end{matrix}$$

$$\begin{matrix}C=C\text{------}N-R_3 & X^- \\ =C & C-CH=(CH-CH)_{m-1}=C \\ & Q_1 \end{matrix} \quad \begin{matrix}R_3-N\text{------}C=O \\ C=[M] \\ Q_1 \end{matrix}$$

$$\begin{matrix}O=C\text{------}N-R_3 & X^- & \cdots Z\cdots \\ =C & C-CH=(CH-CH)_{m-1}=C\text{------}(CH=CH)_{n-1}\text{------}C-R \\ & Q_1 \end{matrix}$$

$$\begin{matrix}O=C\text{------}N-R_3 & X^- & & R_3 \\ =C & C-(CH=CH)_b\text{------}\phantom{xx}\text{------}N \\ & Q_1 & & R_3 \end{matrix}$$

$$\begin{matrix}O=C\text{------}N-R_3 & X^- & \ulcorner\text{-}J\text{-}\urcorner \\ =C & C-(CH=CH)_b-C=C-N-R_5 \\ & Q_1 & R_4 \end{matrix}$$

and $$\begin{matrix}O=C\text{------}N-R_3 & X^- & & R_4 \\ =C & C\text{------}(CH=CH)_{m-1}-N \\ & Q_1 & & R_5 \end{matrix}$$

wherein R, Z, n, m, and $Q_1$ each has the meaning indicated above; and Q represents the non-metallic atoms necessary to complete a heterocyclic nucleus containing from 5 to 6 atoms in the ring;

$R_3$ represents a member selected from the group consisting of alkyl, aralkyl and aryl;

$R_6$ represents a member selected from the group consisting of alkyl and aralkyl;

$X^-$ represents an acid radical;

b represents a positive integer from 1 to 2;

J represents the non-metallic atoms necessary to complete a pyrrole nucleus and $R_4$ and $R_5$ each represents a member selected from the group consisting of hydrogen alkyl, aryl and a chemical bond in the same pyridine ring.

2. The composition of claim 1 wherein the relative proportions of halogen-containing sensitizing agent to merocyanine are between 1 and 150 parts by weight of sensitizing agent for each part by weight of merocyanine.

3. The composition of claim 1 wherein the sensitizing agent is a compound with at least three bromine atoms attached to a single carbon atom.

4. The composition of claim 3 wherein the sensitizing agent is carbon tetrabromide.

5. The composition of claim 3 wherein the sensitizing agent is pentabromoethane.

6. The composition of claim 3 wherein the sensitizing agent is hexabromoethane.

7. A self-sustaining film comprising the composition of claim 1 in a film-forming chemically inert plastic carrier material.

8. A photosensitive article comprising at least one layer composed of the composition of claim 1 supported on a base.

9. The article of claim 8 wherein the base is paper.

10. The article of claim 8 wherein the base is translucent.

11. An article of manufacture comprising a plurality of layers formulated of compositions according to claim 1 in which each layer contains a merocyanine dye sensitive to light of a wavelength different from the wavelength to which the merocyanine dye in any other layer is sensitive, said layers being on a solid supporting substrate.

12. A bleach-out layer of color photographic material comprising a composition according to claim 1 and having a plurality of merocyanine dyes therein.

13. A photographic process comprising preparing a layer containing the composition of claim 1, exposing the layer to light of a suitable wavelength to produce an image therein by bleachout of the merocyanine dye; and thereafter heating said image-bearing layer to fix the image therein and to destroy the photosensitivity of the layer.

14. A direct positive photographic process which comprises preparing a composition consisting of a mixture of merocyanine dyes and at least one sensitizing agent for said dyes selected from the group consisting of organic halogen compounds in which at least three halogen atoms are attached to a single carbon atom, said sensitizing agent being present in at least a sensitizing amount, dispersing said composition in a photochemically inert carrier; coating said dispersion on a solid substrate; and exposing the supported coating to light of a suitable color, matched to the merocyanine dyes in the mixture, thereby obtaining a direct positive image by bleaching out of said merocyanine dyes.

15. The process of claim 14 wherein the exposure is effected by light falling on the back of the sensitive layer, the face of which is in contact with a subject to be copied.

16. A photosensitive composition consisting essentially of a merocyanine dye which bleaches out when exposed to radiation of a suitable wavelength and a normally solid organic halogen containing compound which accelerates bleach out of said merocyanine dye on said exposure; said organic halogen containing compound being selected from the group represented by the general formula $A-C-X_3$ wherein A represents a monovalent radical selected from the group consisting of H, Cl, Br, I, alkyl, and aryl, and each X represents a halogen selected from the group consisting of Cl, Br and I; said organic halogen containing compound being present in sensitizing amounts in said composition, there being from about 1 to 10,000 parts by weight of normally solid organic halogen containing compound for each part by weight of merocyanine dye.

17. The composition of claim 16 wherein each X represents a bromine atom.

18. The composition of claim 17 wherein the organic halogen compound is a halogenated lower alkane selected from the group consisting of carbon tetrabromide, pentabromoethane and hexabromoethane.

19. The composition of claim 18 wherein the proportion of organic halogen containing compound is between 1 and 150 parts by weight for every part by weight of merocyanine dye.

20. The composition of claim 1 wherein the merocyanine dye is a merocyanine represented by the formula $$\begin{matrix} & & & & & & \ulcorner O & R_1 \urcorner \\ \ulcorner\text{------}Z\text{------}\urcorner & & & & & & \parallel & \vert \\ & & & & & & C\text{------}N & \diagdown Q \\ R-N-(CH=CH)_{n-1}-C=(CH-CH)_{m-1}=C & C=\hspace{-6pt}=C & \diagup & C=O \\ & & & & \diagdown Q_1 \diagup & & \lrcorner_{d-1} \end{matrix}$$

wherein R, Z, $R_1$, $Q_1$, Q, n, and m each has the same meaning as specified in claim 1 and d is a positive integer between 1 and 4.

21. The composition of claim 1 wherein the merocyanine dye is a quaternized merocyanine represented by the formula $$\begin{matrix} O & R_3 \\ \parallel & \vert & X^- \\ C\text{------}N \\ & & \\ [M]=C & C-S-R_4 \\ & Q_1 \end{matrix}$$

wherein [M], $Q_1$, $X^-$, $R_3$ and $R_4$ each has the same meaning as in claim 1.

22. The composition of claim 1 wherein the merocyanine dye is a quaternary salt represented by the formula

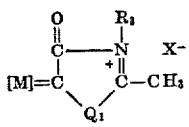

wherein [M], Q₁, R₃ and X⁻ each has the same meaning as in claim 1.

23. The composition of claim 1 wherein the merocyanine dye is a bismerocyanine represented by the formula

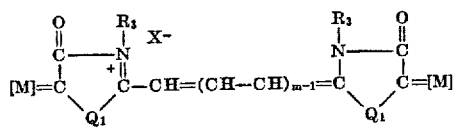

wherein [M], Q₁, X⁻, R₃ and m each has the same meaning as in claim 1.

24. The composition of claim 1 wherein the merocyanine dye is represented by the formula

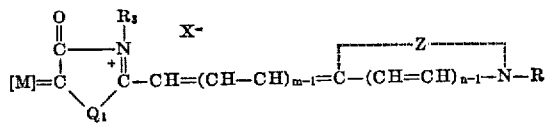

wherein [M], Q, R₃, X⁻, Z, R, m and n each has the same meaning as in claim 1.

25. The composition of claim 1 wherein the merocyanine dye is represented by the formula

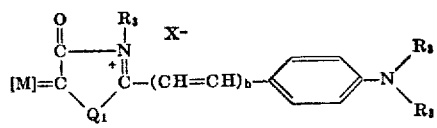

wherein [M], Q₁, R₃, X⁻, and b each has the same meaning as in claim 1.

26. The composition of claim 1 wherein the merocyanine dye is a complex pyrrolocyanine dye represented by the formula

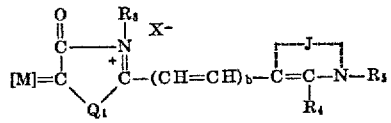

wherein [M], Q₁, R₃, X⁻, b, R₄, R₅ and J each has the same meaning as in claim 1.

27. The composition of claim 1 wherein the merocyanine dye is a complex hemicyanine represented by the formula

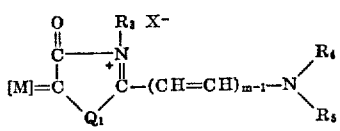

wherein M, Q₁, R₃, X⁻, m, R₄ and R₅ each has the same meaning as in claim 1.

References Cited in the file of this patent
UNITED STATES PATENTS

| | | |
|---|---|---|
| 1,804,674 | Clarke | May 12, 1931 |
| 1,926,643 | Bialon | Sept. 12, 1933 |
| 2,054,390 | Rust | Sept. 15, 1936 |
| 2,186,624 | Brooker | Jan. 9, 1940 |
| 2,213,745 | Schinzel et al. | Sept. 3, 1940 |
| 2,653,152 | Dessauer et al. | Sept. 22, 1953 |

FOREIGN PATENTS

| | | |
|---|---|---|
| 209,983 | Germany | Sept. 20, 1907 |
| 323,384 | Italy | Dec. 19, 1934 |
| 486,006 | Great Britain | May 27, 1938 |
| 201,416 | Australia | Apr. 13, 1956 |

UNITED STATES PATENT OFFICE
CERTIFICATE OF CORRECTION

Patent No. 3,102,027            August 27, 1963

Robert H. Sprague et al.

It is hereby certified that error appears in the above numbered patent requiring correction and that the said Letters Patent should read as corrected below.

Column 1, line 31, after "above" insert a comma; line 46, for "man" read -- many --; column 6, line 17, for "-4(5)thiazole" read -- -4(5)thiazolone --; column 7, lines 3 to 8, column 8, lines 3 to 9, and lines 24 to 29, column 9, lines 3 to 11, lines 29 to 35, and lines 56 to 64, column 10, lines 10 to 17, column 11, lines 44 to 49, and lines 60 to 65, column 12, lines 65 to 71, column 13, lines 11 to 19, lines 31 to 36, lines 50 to 56, and lines 70 to 75, and column 14, lines 21 to 28, for that portion of each formula reading

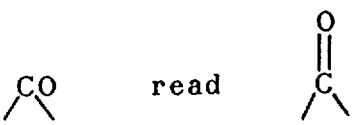

column 7, line 31, after "indicated" insert -- above --; column 8, lines 3 to 9, upper right-hand portion of formula (C), for "[SO₃O₇H₇]⁻" read -- [SO₃C₇H₇]⁻ --; line 21, for "ethylene]-" read -- ethylidene]- --; line 34, for "MEROCYANINE" read -- MEROCYANINES --; same column 8, lines 47 to 58, formula (E) should appear as shown below instead of as in the patent:

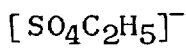

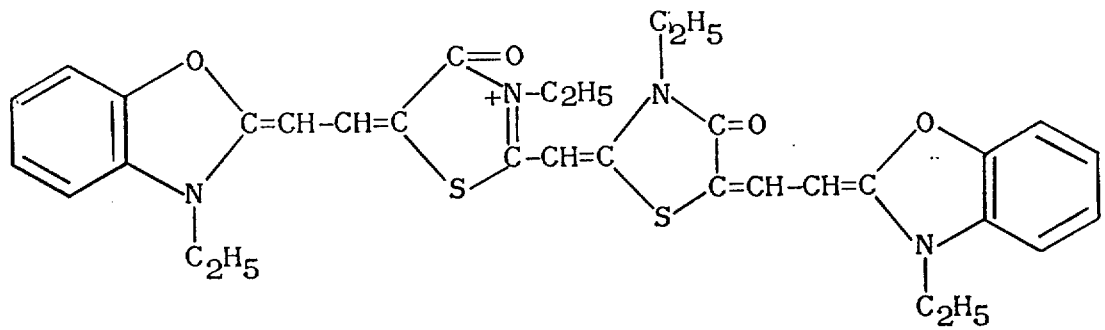

3,102,027 same column 8, lines 67 to 70, the left-hand portion of the formula should appear as shown below instead of as in the patent:

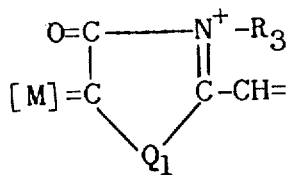

column 9, line 1, for "ethylene]-" read -- ethylidene]- --; lines 3 to 11, the left-hand portion of formula (F) should appear as shown below instead of as in the patent:

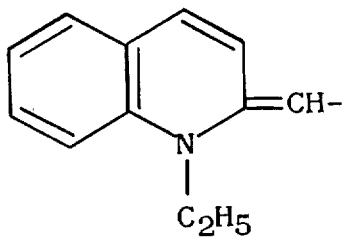

column 10, line 5, after "R₄" insert -- and m represents an integer from 1 to 4 --; lines 10 to 17, the left-hand portion of formula (I) should appear as shown below instead of as in the patent:

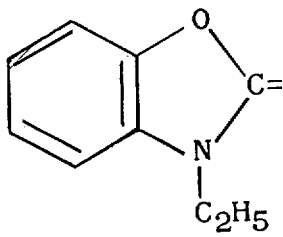

column 11, line 41, for "ethylene]-2-" read -- ethylidene]-2- --; line 42, for "-thiazolone-p-" read -- -thiazolone-etho-p- --; lines 60 to 65, the right-hand portion of the formula should appear as shown below instead of as in the patent:

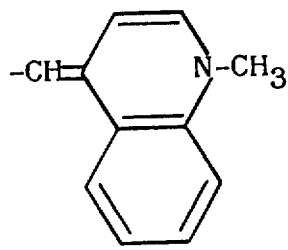

3,102,027 column 12, line 22, for "were" read -- was --; column 14, lines 34 and 35, for "reflux", each occurrence, read -- reflex --; column 15, lines 11 to 14, the left-hand portion of the formula should appear as shown below instead of as in the patent:

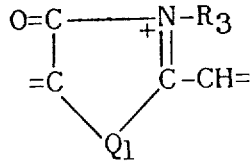

same column 15, lines 15 to 18, the right-hand portion of the formula should appear as shown below instead of as in the patent:

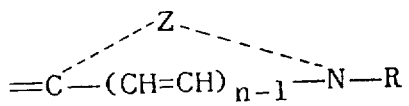

same column 15, line 46, after "hydrogen" insert a comma.

Signed and sealed this 5th day of May 1964.

(SEAL)
Attest:

ERNEST W. SWIDER
Attesting Officer

EDWARD J. BRENNER
Commissioner of Patents